US006760658B2

(12) United States Patent
Yasui et al.

(10) Patent No.: US 6,760,658 B2
(45) Date of Patent: Jul. 6, 2004

(54) EXHAUST EMISSION CONTROL SYSTEM FOR INTERNAL COMBUSTION ENGINE

(75) Inventors: Yuji Yasui, Wako (JP); Hiroshi Tagami, Wako (JP); Yoshihisa Iwaki, Wako (JP); Kunihiro Morishita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 253 days.

(21) Appl. No.: 10/001,817

(22) Filed: Dec. 5, 2001

(65) Prior Publication Data

US 2002/0099493 A1 Jul. 25, 2002

(30) Foreign Application Priority Data

Dec. 5, 2000 (JP) ....................................... 2000-369765

(51) Int. Cl.[7] ................................................. B60T 7/12

(52) U.S. Cl. ........................... 701/106; 60/276; 60/278; 123/90.11

(58) Field of Search ................................ 701/106, 108, 701/103, 114; 123/90.11, 90.12, 90.15; 60/276, 274, 277, 278

(56) References Cited

U.S. PATENT DOCUMENTS 5,771,685 A 6/1998 Hepburn .......................... 3/20
6,467,256 B2 * 10/2002 Hashimoto ................... 60/277
6,484,493 B2 * 11/2002 Takanohashi ................ 60/277

FOREIGN PATENT DOCUMENTS

| | | | | |
|---|---|---|---|---|
| EP | 0 915 399 A2 | 5/1999 | ...................... | 13/4 |
| EP | 0 943 786 A2 | 9/1999 | ........................ | 3/8 |
| JP | 2692380 | 9/1997 | | |

* cited by examiner

*Primary Examiner*—Willis R. Wolfe
*Assistant Examiner*—Johnny H. Hoang
(74) *Attorney, Agent, or Firm*—Arent Fox PLLC

(57) ABSTRACT

An exhaust emission control system for an internal combustion engine having an exhaust system is disclosed. The control system may include an exhaust gas purifying device provided in the exhaust system and an oxygen concentration sensor provided downstream of the exhaust gas purifying device. The exhaust gas purifying device may include at least an oxygen storing ability or a nitrogen oxide storing ability. An air-fuel ratio of an air-fuel mixture supplied to the engine may be enriched with respect to the stoichiometric air-fuel ratio, so as to reduce the oxygen or nitrogen oxides stored in the exhaust gas purifying device. A predicted value of the output from the oxygen concentration sensor may be calculated using a predictor based on the fuzzy logic reasoning. The completion of the reduction of the oxygen or nitrogen oxides stored in said exhaust gas purifying device may be determined according to the predicted value.

21 Claims, 8 Drawing Sheets

| | | σPRE(k) | | |
|---|---|---|---|---|
| | | N | ZO | P |
| VO2TM(k) | P | N (i=7) | ZO (i=8) | P (i=9) |
| | ZO | N (i=4) | ZO (i=5) | P (i=6) |
| | N | N (i=1) | ZO (i=2) | P (i=3) |

| i | CASE1 σPRE(k)=σPRE1 VO2TM(k)=VO2TM1 | | CASE2 σPRE(k)=σPRE2 VO2TM(k)=VO2TM2 | |
|---|---|---|---|---|
| | WPREσ | WPREV | WPREσ | WPREV |
| 1 | 1 | 1 | WPREσN2 | WPREVN2 |
| 2 | 0 | 1 | WPREσZ2 | WPREVN2 |
| 3 | 0 | 1 | 0 | WPREVN2 |
| 4 | 1 | 0 | WPREσN2 | WPREVZ2 |
| 5 | 0 | 0 | WPREσZ2 | WPREVZ2 |
| 6 | 0 | 0 | 0 | WPREVZ2 |
| 7 | 1 | 0 | WPREσN2 | 0 |
| 8 | 0 | 0 | WPREσZ2 | 0 |
| 9 | 0 | 0 | 0 | 0 |

EXHAUST EMISSION CONTROL SYSTEM FOR INTERNAL COMBUSTION ENGINE

BACKGROUND OF THE INVENTION

The present invention relates to an exhaust emission control system for an internal combustion engine, and more particularly to an exhaust emission control system for an internal combustion engine having an exhaust system provided with a catalyst having an oxygen storing ability and/or a nitrogen oxide storing ability.

A three-way catalyst generally used in an exhaust system of an internal combustion engine has an oxygen storing ability in addition to the essential capabilities of the catalyst. Immediately after shifting from a fuel-cut operation for cutting off the supply of fuel to the engine during a normal operation for supplying the fuel to the engine, an original reducing ability of the three-way catalyst is greatly lowered due to the stored oxygen in the catalyst. This problem is conventionally solved by enriching an air-fuel ratio immediately after termination of the fuel-cut operation to thereby quickly remove the oxygen stored in the three-way catalyst within a short period of time.

Further, it is known that an exhaust emission control system including a NOx (nitrogen oxides) catalyst may be applied to an engine designed to frequently perform a lean operation in which the air-fuel ratio is set in a lean region with respect to the stoichiometric air-fuel ratio. The NOx catalyst has a NOx trapping ability for trapping NOx emitted during the lean operation. In this exhaust emission control system, the NOx contained in the exhaust gases during the lean operation is trapped by the NOx catalyst, so that the air-fuel ratio is intermittently enriched and the NOx trapped by the NOx catalyst is reduced.

Regarding the above-mentioned enrichment of the air-fuel ratio (which will be hereinafter referred to as "reduction enrichment", also includes the enrichment for removing the oxygen stored in the three-way catalyst), if the time period of executing the enrichment process is too short, the removal of the oxygen or NOx becomes incomplete. On the other hand, if the time period of executing the enrichment process is too long, the emission of HC and CO increases. Accordingly, a problem may arise in determining how to decide the time period of executing the enrichment process (the end time of the enrichment process).

In a known method, the reduction enrichment process is executed for a predetermined time period. However, it is difficult to set the execution time period to an optimum execution time period which varies with the engine operating conditions. To cope with this problem, there has been proposed a technique such that an oxygen concentration sensor is provided downstream of the catalyst and the reduction enrichment is ended at the time an output from the oxygen concentration sensor has changed to a value indicative of a rich air-fuel ratio with respect to the stoichiometric air-fuel ratio (Japanese Patent No. 2692380).

However, there is a delay time TD from the time when the target air-fuel ratio changes to terminate the enrichment process until the time when the exhaust gases reflecting the changed target air-fuel ratio reaches the catalyst. As a result, the technique described in Japanese Patent No. 2692380 has the following problem. Although the removal of the oxygen or NOx stored in the catalyst is completed at the time the output from the oxygen concentration sensor provided downstream of the catalyst changes to a value indicative of a rich air-fuel ratio, the exhaust gases reflecting the rich air-fuel ratio are still being emitted during the delay time TD, which results in an increase in the emission quantity of HC and CO.

SUMMARY OF THE INVENTION

It is accordingly an object of the present invention to provide an exhaust emission control system which can more properly control the time period of executing the reduction enrichment process for removing the oxygen or NOx stored in the catalyst, thereby maintaining good exhaust emission characteristics.

The present invention provides an exhaust emission control system for an internal combustion engine having an exhaust system. The control system includes exhaust gas purifying means, an oxygen concentration sensor, air-fuel ratio control means, predicting means, and determining means. The exhaust gas purifying means is provided in the exhaust system and has at least one of an oxygen storing ability and a nitrogen oxide storing ability. The oxygen concentration sensor is provided downstream of the exhaust gas purifying device. The air-fuel ratio control means enriches an air-fuel ratio of an air-fuel mixture supplied to the engine with respect to a stoichiometric air-fuel ratio, so as to reduce the oxygen or nitrogen oxides stored in the exhaust gas purifying device. The predicting means calculates a predicted value of an output from the oxygen concentration sensor by using a predictor based on the fuzzy logic reasoning. The determining means determines the completion of the reduction of the oxygen or the nitrogen oxides stored in the exhaust gas purifying means according to the predicted value.

With this configuration, a predicted value of the output from the oxygen concentration sensor is calculated by using a predictor based on the fuzzy logic reasoning, and the completion of the reduction of oxygen or nitrogen oxides stored in the exhaust gas purifying means is determined according to the above predicted value. Accordingly, a more precise predicted value of the output from the oxygen concentration sensor can be obtained on the basis of a relatively simple empirical rule, and the completion timing of the reduction of oxygen or nitrogen oxides can be determined slightly earlier than the actual completion timing. By utilizing the result of this determination, the execution of the time period of the reduction enrichment process can be controlled more properly than that in conventional techniques.

Preferably, the air-fuel ratio control means terminates the enrichment of the air-fuel ratio at the time the predicted value has changed from a value indicative of a lean air-fuel ratio with respect to the stoichiometric air-fuel ratio to a value indicative of a rich air-fuel ratio with respect to the stoichiometric air-fuel ratio.

With this configuration, the enrichment of the air-fuel ratio is terminated at the time the predicted value of the oxygen concentration sensor output has changed from the value indicative of a lean air-fuel ratio to the value indicative of a rich air-fuel ratio with respect to the stoichiometric air-fuel ratio. Accordingly, it is possible to avoid a situation where the enrichment execution time period may last too long, which results in an increase in the emission quantity of HC and CO.

Preferably, the air-fuel ratio control means controls the air-fuel ratio to a value near the stoichiometric air-fuel ratio during a predetermined time period after the termination of the enrichment process.

With this configuration, the air-fuel ratio is controlled to a value near the stoichiometric air-fuel ratio during a predetermined time period after the termination of the enrichment process. Accordingly, a small amount of oxygen or NOx remaining in the exhaust gas purifying means at the time of terminating the enrichment process can be sufficiently removed. That is, in come cases, the oxygen or NOx stored in the exhaust gas purifying means cannot be completely removed, but partially remains even after the termination of the enrichment process, depending on the structure of the exhaust gas purifying means. By maintaining the air-fuel ratio at the value near the stoichiometric air-fuel ratio during the predetermined time period after the termination of the enrichment process, the oxygen or NOx can be completely removed.

Preferably, the predicting means may use the output from the oxygen concentration sensor as an input of the predictor in calculating the predicted value.

With this configuration, the oxygen concentration sensor output may be used as the input of the predictor to calculate the predicted value. Accordingly, the configuration of the predictor can be made relatively simple, and human empirical rules can be easily reflected in the membership functions of the fuzzy logic reasoning. As a result, the membership function can be easily set and the prediction accuracy can be improved.

Preferably, the predicting means uses the output from the oxygen concentration sensor and a parameter including a steady-state component and a component indicative of an amount of change in the oxygen concentration sensor output as inputs of the predictor in calculating the predicted value.

With this configuration, the oxygen concentration sensor output and the parameter including a steady-state component and a component indicative of an amount of change in the actual value are used as inputs of the predictor based on the fuzzy logic reasoning. Accordingly, the state where the oxygen concentration sensor output remains at a substantially constant value, or the state where the oxygen concentration sensor output varies largely can be accurately predicted, so that a precise predicted value can be obtained.

Preferably, the predicting means calculates the predicted value using a min-max-barycenter method and a bar-shaped function on the based upon the fuzzy logic reasoning.

With this configuration, the min-max-barycenter method is used for the calculation of the predicted value, and the bar-shaped function is based upon the fuzzy logic reasoning. Accordingly, the operation for the calculation can be simplified and the control can be performed at shorter repetition periods.

Preferably, the air-fuel ratio control means executes the enrichment process of the air-fuel ratio when a fuel-cut operation for cutting off the supply of fuel to the engine is terminated or when a target air-fuel ratio of the air-fuel mixture supplied to the engine is changed from a lean value with respect to the stoichiometric air-fuel ratio to the stoichiometric air-fuel ratio or to a rich value with respect to the stoichiometric air-fuel ratio.

DETAILED DESCRIPTION OF THE PREFERRED EMBODIMENTS

A preferred embodiment of the present invention will now be described with reference to the drawings.

Figure 1:
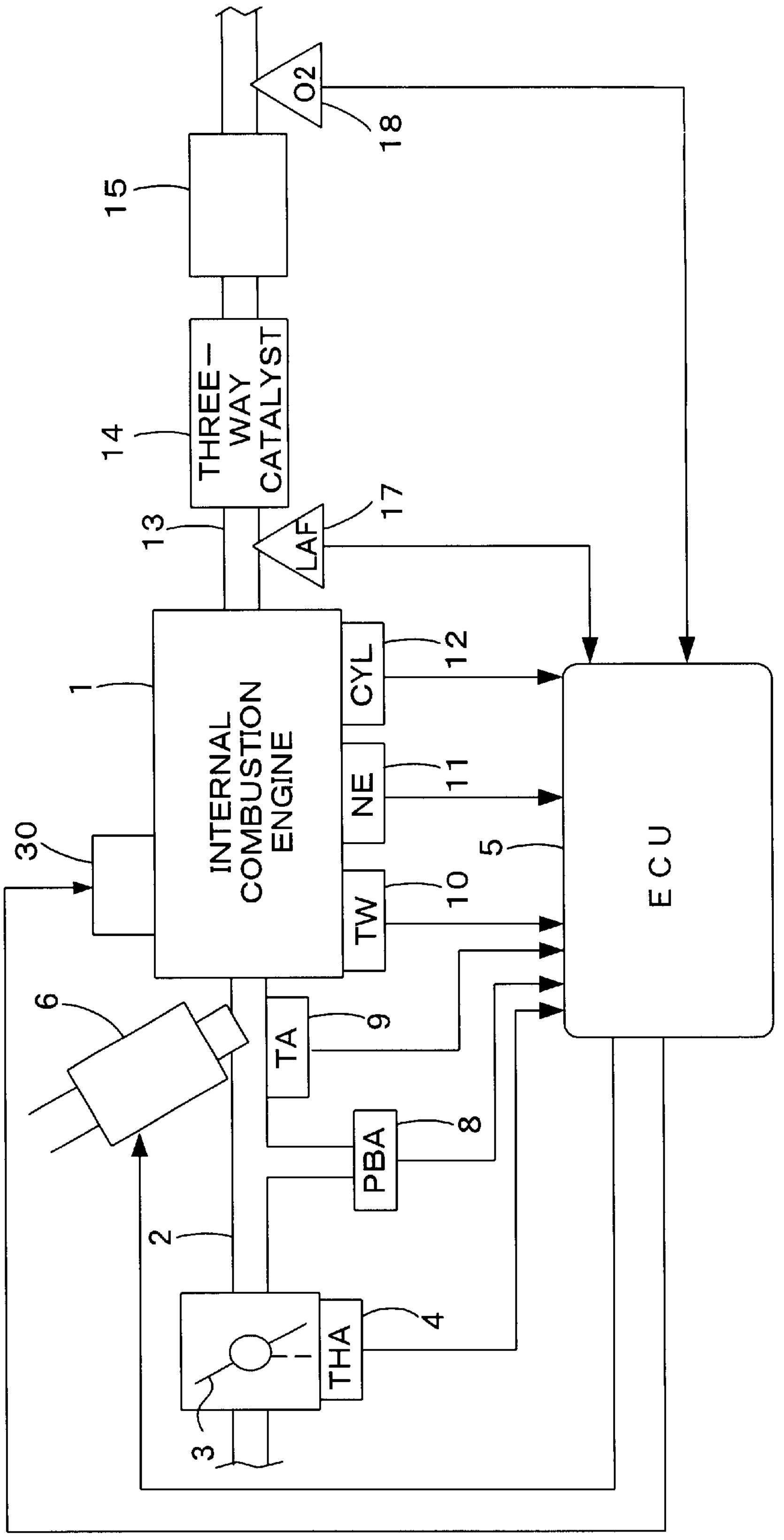
FIG. 1 is a schematic diagram showing a general configuration of an internal combustion engine and a control system therefor according to a preferred embodiment of the present invention.

Referring to FIG. 1, there is schematically shown a general configuration of an internal combustion engine (which will be hereinafter referred to as "engine") and a control system therefor, including an exhaust emission control system according to a preferred embodiment of the present invention. The engine is, for example, a four-cylinder engine 1. The engine 1 may include an intake pipe 2 provided with a throttle valve 3. A throttle valve opening (THA) sensor 4 may be connected to the throttle valve 3, so as to output an electrical signal corresponding to an opening of the throttle valve 3 and supply the electrical signal to an electronic control unit (which will be hereinafter referred to as "ECU") 5.

Fuel injection valves 6, only one of which is shown, are inserted into the intake pipe 2 at locations intermediate between the cylinder block of the engine 1 and the throttle valve 3 and slightly upstream of the respective intake valves (not shown). The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 8 is provided immediately downstream of the throttle valve 3. An absolute pressure signal, which is converted to an electrical signal by the absolute intake pressure sensor 8, is supplied to the ECU 5. An intake air temperature (TA) sensor 9 is provided downstream of the absolute intake pressure sensor 8 to detect an intake air temperature TA. An electrical signal corresponding to the detected intake air temperature TA, is outputted from the sensor 9 and supplied to the ECU 5.

An engine coolant temperature (TW) sensor 10 such as a thermistor is mounted on the body of the engine 1 to detect an engine coolant temperature (cooling water temperature) TW. A temperature signal corresponding to the detected engine coolant temperature TW is output from the sensor 10 and supplied to the ECU 5.

An engine rotational speed (NE) sensor 11 and a cylinder discrimination (CYL) sensor 12 are mounted in facing relation to a camshaft or a crankshaft (both not shown) of the engine 1. The engine rotational speed sensor NE 11 outputs a top dead center (TDC) signal pulse at a crank angle position located at a predetermined crank angle before the top dead center (TDC) corresponding to the start of an intake stroke of each cylinder of the engine 1 (for example, at every 180° crank angle in the case of a four-cylinder engine). The cylinder discrimination (CYL) sensor 12 outputs a cylinder discrimination (CYL) signal pulse at a predetermined crank angle position for a specific cylinder of the engine 1. The CYL signal pulses output from the sensors 11 and 12 are supplied to the ECU 5.

An exhaust pipe 13 of the engine 1 is provided with a three-way catalyst 14 and a NOx removing device 15 arranged downstream of the three-way catalyst 14, which operates as the exhaust gas purifying means for this embodiment of the present invention.

The three-way catalyst 14 has an oxygen storing ability. That is, the three-way catalyst 14 stores oxygen contained in the exhaust gases in the exhaust lean condition where the air-fuel ratio of an air-fuel mixture to be supplied to the engine 1 is set in a lean region with respect to the stoichiometric ratio. Therefore, during the exhaust lean condition, the oxygen concentration in the exhaust gases may be relatively high. On the other hand, the three-way catalyst accelerates the oxidization of the HC and CO contained in the exhaust gases by using the stored oxygen, during an exhaust rich condition. An exhaust rich condition exists when the air-fuel ratio of the air-fuel mixture to be supplied to the engine 1 is set in a rich region with respect to the stoichiometric ratio, and the oxygen concentration in the exhaust gases is therefore low with a large proportion of HC and CO components.

The NOx removing device 15 includes a NOx trapping agent for trapping the NOx and a catalyst for accelerating the oxidation and reduction processes. The NOx removing device 15 traps the NOx in the exhaust lean condition where the air-fuel ratio of the air-fuel mixture to be supplied to the engine 1 is set in a lean region with respect to the stoichiometric ratio. The NOx removing device 15 converts the trapped NOx into nitrogen gas by employing the HC and CO. In addition, the NOx removing device 15 oxidizes the HC and CO into water vapor and carbon dioxide by using the trapped NOx in the exhaust rich condition where the air-fuel ratio of the air-fuel mixture to be supplied to the engine 1 is in the vicinity of the stoichiometric ratio or in a rich region with respect to the stoichiometric ratio.

When the amount of NOx trapped by the NOx trapping agent reaches the limit of the NOx trapping agent's NOx storing capacity, i.e., the maximum NOx storing amount, the NOx trapping agent cannot trap any more NOx. In order to reduce the trapped NOx at any suitable time, the air-fuel ratio is enriched, that is, a reduction enrichment process of the air-fuel ratio for reducing the trapped NOx is performed. In this preferred embodiment, the air-fuel ratio enrichment for removing the oxygen stored in the three-way catalyst 14, which may proceed immediately after the fuel-cut operation, will be referred to also as "reduction enrichment".

A proportional type air-fuel ratio sensor (which will be hereinafter referred to as "LAF sensor") 17 may be mounted on the exhaust pipe 13 at a position upstream of the three-way catalyst 14. The LAF sensor 17 outputs an electrical signal substantially proportional to the oxygen concentration (air-fuel ratio) in the exhaust gases, and supplies the electrical signal to the ECU 5.

A binary type oxygen concentration sensor (which will be hereinafter referred to as "O2 sensor") 18 may be mounted on the exhaust pipe 13 at a position downstream of the NOx removing device 15. A detection signal transmitted from the O2 sensor 18 is supplied to the ECU 5. The O2 sensor 18 may be configured so that the O2 sensor's output rapidly changes in the vicinity of the stoichiometric ratio. More specifically, the output from the O2 sensor 18 may include a high level in a rich region with respect to the stoichiometric ratio, and may include a low level in a lean region with respect to the stoichiometric ratio.

The engine 1 may include a valve timing switching mechanism 30 capable of switching the valve timing of the intake valves and exhaust valves between a high-speed valve timing suitable for a high-speed operating region of the engine 1 and a low-speed valve timing suitable for a low-speed operating region of the engine 1. The process of switching the valve timing may also include switching of a valve lift amount. Further, when selecting the low-speed valve timing, one of the two intake valves in each cylinder may be stopped to ensure stable combustion even in the case of setting the air-fuel ratio lean with respect to the stoichiometric ratio.

The valve timing switching mechanism 30 may be a type of valve such that the switching of the valve timing is carried out hydraulically. For example, a solenoid valve for performing the hydraulic switching and an oil pressure sensor may be connected to the ECU 5. A detection signal from the oil pressure sensor may be supplied to the ECU 5, and the ECU 5 may control the solenoid valve to perform the switching control of the valve timing according to the operating conditions of the engine 1.

The ECU 5 may include an input circuit having various functions including a function of shaping the waveforms of the input signals received from the various sensors, a function of correcting the voltage levels of the input signals to a predetermined level, and a function of converting the analog signal values into digital signal values, a central process unit (which will be hereinafter referred to as "CPU"), a memory circuit preliminarily storing various operational programs to be executed by the CPU and for storing the results of the computations or the like by the CPU, and an output circuit for supplying the drive signals to the fuel injection valves 6.

The CPU of the ECU 5 may determine various engine operating conditions according to various engine parameter signals as mentioned above, and may compute a fuel injection period TOUT of each fuel injection valve 6 to be opened in synchronism with the TDC signal pulse, from Eq. (1) according to the above determined engine operating conditions.

$$TOUT=TIM\times KCMD\times KLAF\times K1+K2 \quad (1)$$

The term TIM is a basic fuel amount, more specifically, a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 may become substantially equal to the stoichiometric ratio in an operating condition according to the engine rotational speed NE and the absolute intake pressure PBA. That is, the basic fuel amount TIM may have a value substantially proportional to an intake air amount (mass flow) per unit time by the engine 1.

The term KCMD is a target air-fuel ratio coefficient, which is set according to the engine operating parameters, such as the engine rotational speed NE, the throttle opening THA, and the engine coolant temperature TW. The target air-fuel ratio coefficient KCMD may be proportional to the reciprocal of an air-fuel ratio A/F, i.e., proportional to a fuel-air ratio F/A, and may take a value of 1.0 for the stoichiometric ratio. Therefore, KCMD may also referred to as a target equivalent ratio.

The term KLAF is an air-fuel ratio correction coefficient calculated by a proportional integral and differential feedback (PID) control so that a detected equivalent ratio KACT calculated from a detected value from the LAF sensor 17 becomes equal to the target equivalent ratio KCMD when the conditions for executing the feedback control are satisfied.

The term K1 is another correction coefficient, and the term K2 is a correction variable computed according to various engine parameter signals. The correction coefficient K1 and the correction variable K2 are set to such values as to optimize various characteristics such as the fuel consumption characteristics and the engine acceleration characteristics according to engine operating conditions.

The CPU of the ECU 5 may supply a drive signal for opening each fuel injection valve 6 according to the fuel injection period TOUT obtained, as discussed above, through the output circuit to the fuel injection valve 6.

In this preferred embodiment, the reduction enrichment for setting the air-fuel ratio in a rich region with respect to the stoichiometric air-fuel ratio is performed to remove the oxygen stored in the three-way catalyst 14 immediately after the completion of the fuel-cut operation for cutting off the supply of fuel to the engine 1 (i.e., immediately after restarting the fuel supply to the engine 1). Furthermore, after the time the lean operation has continued for a predetermined time period, the reduction enrichment for reducing the NOx stored in the NOx removing device 15 is performed. At this time, the execution time period (the completion timing) of the reduction enrichment is decided according to a predicted value of an output VO2 transmitted from the O2 sensor 18. This predicted value is calculated by a predictor based on the fuzzy logic reasoning to be described below. [0054] The output voltage V02 from the 02 sensor 18 may be, for example, in the range of about 0.1 V to about 1 V. The predictor in this preferred embodiment may use a deviation voltage VO2TM defined by Eq. (2) shown below as an input parameter.

$$VO2TM=VO2-VCNT \quad (2)$$

where VCNT is a predetermined value set, for example, to about 0.6 V.

Figures 2, 3:
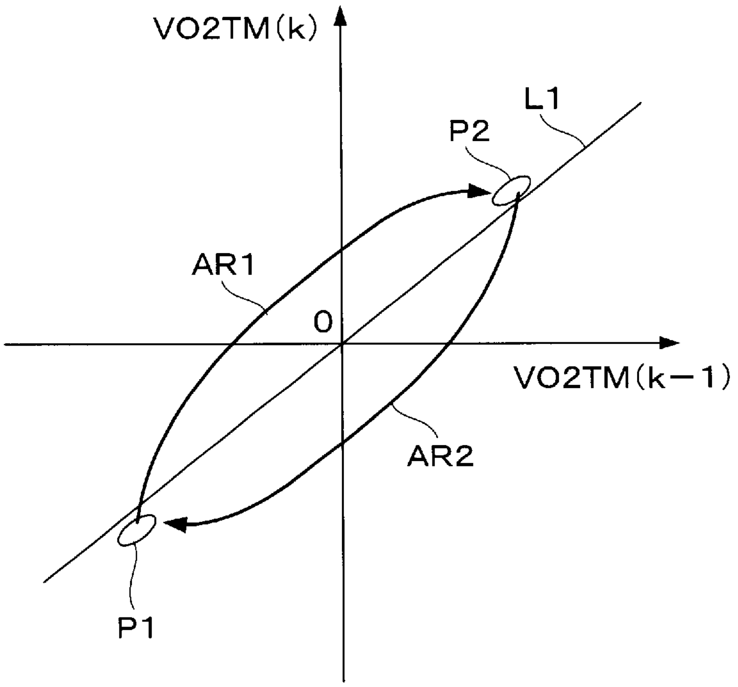
FIG. 2 is a graph for illustrating a tendency of an oxygen concentration sensor output to change.
FIG. 3 is a table showing rules used for the fuzzy logic reasoning.

FIG. 2 is a phase plane used for the sliding mode control or a similar control device, showing the relation between a present value VO2TM(k) of the deviation voltage VO2TM and a value before one sampling period (which will be hereinafter referred to as "preceding value") VO2TM(k−1) of the deviation voltage VO2TM.

When the deviation voltage VO2TM remains at a low level (for example, at approximately −0.6 V), a sample point corresponding to the present value VO2TM(k) and the preceding value VO2TM(k−1) may be located in the vicinity of a region P1. When the deviation voltage VO2TM remains at a high level (about 0.4 V), a sample point corresponding to the present value VO2TM(k) and the preceding value VO2TM(k−1) may be located in the vicinity of a region P2. When the deviation voltage VO2TM changes from the low level to the high level, the sample point may move from the region P1 to the region P2 along a locus as shown by an arrow AR1. When the deviation voltage VO2TM changes from the high level to the low level, the sample point may move from the region P2 to the region P1 along a locus as shown by an arrow AR2. It is empirically confirmed that the behavior of the sample point on the phase plane shown in FIG. 2 is almost constant irrespective of the operating conditions of the engine 1 or the condition of the three-way catalyst 14 or the NOx removing device 15 (the stored amount of oxygen or NOx, the degree of deterioration, etc.).

The deviation voltage VO2TM and a switching function value δ PRE(k) defined by Eq. (3) shown below may be used as input parameters for the predictor based on the fuzzy logic reasoning.

$$\delta PRE(k)=VO2TM(k)+PRES\times VO2TM(k-1) \quad (3)$$

In the case where δPRE(k)=0 in Eq. (3), this equation indicates a straight line passing through the origin in FIG. 2. In this case, a coefficient PRES is decided as follows:

Firstly, a straight line L1 passing through the origin is drawn so that the regions P1 and P2 shown in FIG. 2 are located on the opposite sides of the straight line L1, and secondly, the switching function value a pre is calculated from the slope of the straight line L1 (PRES corresponding to the straight line L1 shown in FIG. 2 is equal to about −0.8).

The switching function value δPRE(k) defined by Eq. (3) includes a steady-state component and a component indicative of an amount of change (differential component) in the deviation voltage VO2TM. Accordingly, the switching function value a pre at the time the value of the deviation voltage VO2TM remains at a low level may be different from the switching function value a pre at the time the value of the deviation voltage VO2TM remains at a high level. Further, when the deviation voltage VO2TM is changing, the switching function value a pre may indicate a value corresponding to an amount of change per unit time.

The states of the input parameters of the predictor as decided above and a general tendency of a deviation voltage predicted in the near future, i.e., a predicted deviation voltage PREVO2F, may be classified, for example, into nine rules as shown in FIG. 3. In the example shown in FIG. 3, "N" indicates a negative value, "Z0" indicates a value near zero, and "P" indicates a positive value. Further, "i" represents a number of the nine rules #1 to #9 to be hereinafter described.

The nine rules #1 to #9 shown in FIG. 3 are as follows:

Rule #1 (i=1): When both the deviation voltage VO2TM (k) and the switching function value a PRE(k) are negative values, the possibility that the predicted deviation voltage PREVO2F in the near future is a negative value is high.

Rule #2 (i=2): When the deviation voltage VO2TM(k) is a negative value and the switching function value a PRE(k) is a value near zero, the possibility that the predicted deviation voltage PREVO2F in the near future is a value near zero is high.

Rule #3 (i=3): When the deviation voltage VO2TM(k) is a negative value and the switching function value a PRE(k) is a positive value, the possibility that the predicted deviation voltage PREVO2F in the near future is a positive value is high.

Rule #4 (i=4): When the deviation voltage VO2TM(k) is a value near zero and the switching function value δPRE(k) is a negative value, the possibility that the predicted deviation voltage PREVO2F in the near future is a negative value is high.

Rule #5 (i=5): When both the deviation voltage VO2TM (k) and the switching function value a PRE(k) are values near zero, the possibility that the predicted deviation voltage PREVO2F in the near future is a value near zero is high.

Rule #6 (i=6): When the deviation voltage VO2TM(k) is a value near zero and the switching function value a PRE(k) is a positive value, the possibility that the predicted deviation voltage PREVO2F in the near future is a positive value is high.

Rule #7 (i=7): When the deviation voltage VO2TM(k) is a positive value and the switching function value a PRE(k)

is a negative value, the possibility that the predicted deviation voltage PREVO2F in the near future is a negative value is high.

Rule #8 (i=8): When the deviation voltage VO2TM(k) is a positive value and the switching function value a PRE(k) is a value near zero, the possibility that the predicted deviation voltage PREVO2F in the near future is a value near zero is high.

Rule #9 (i=9): When both the deviation voltage VO2TM (k) and the switching function value a PRE(k) are positive values, the possibility that the predicted deviation voltage PREVO2F in the near future is a positive value is high.

The decision rules illustrated in FIG. 3 are merely examples. Other decision rules criteria may be employed by the embodiments of the invention.

Figure 4A:
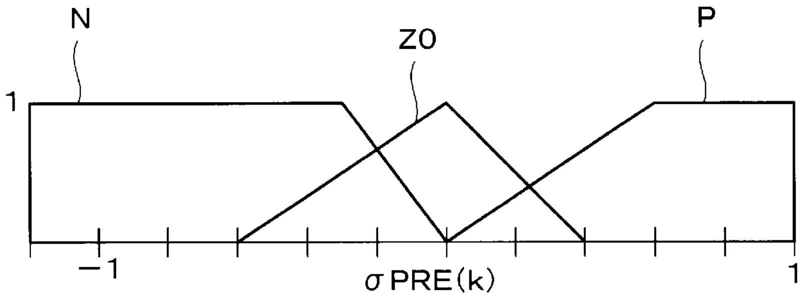
FIGS. 4A to 4C are diagrams showing membership functions used for the fuzzy logic reasoning.
Figure 4B:
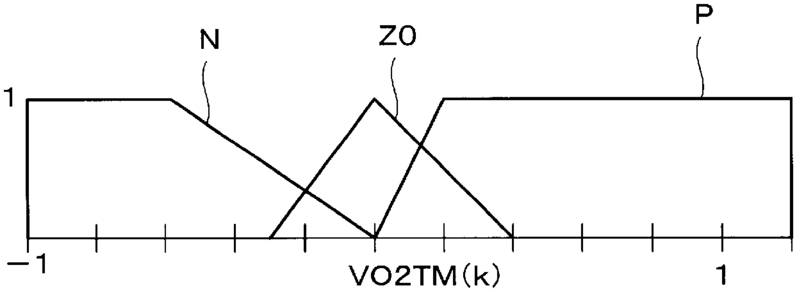

The membership functions on the antecedent corresponding to the switching function value δPRE(k) and the deviation voltage VO2TM(k) are set as shown in FIGS. 4A and 4B, respectively. The antecedent in a given rule is defined as an input membership function. Referring to FIG. 4A, the membership function N corresponds to a function when the switching function value δPRE(k) is a negative value, the membership function Z0 corresponds to a function when the switching function value δPRE(k) is a value near zero, and the membership function P corresponds to a function when the switching function value δPRE(k) is a positive value. Referring to FIG. 4B, the membership function N corresponds to a function when the deviation voltage VO2TM(k) is a negative value, the membership function Z0 corresponds to a function when the deviation voltage VO2TM(k) is a value near zero, and the membership function P corresponds to a function when the deviation voltage VO2TM(k) is a positive value.

Figure 4C:
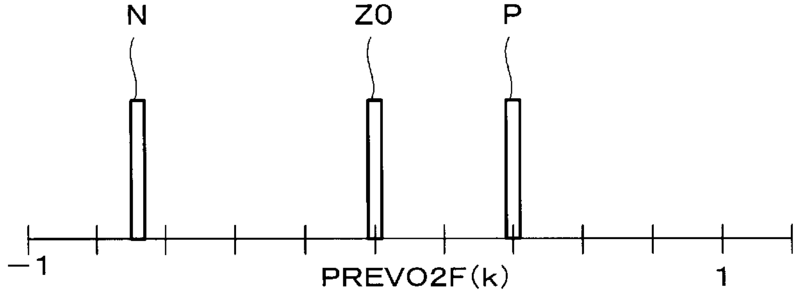

Further, the membership functions on the consequent are set as shown in FIG. 4C. The consequent is defined as an output membership function. That is, the three bar-shaped membership functions (singleton bar-shaped functions) may be set with the horizontal axis representing the predicted deviation voltage PREVO2F corresponding to an output from the predictor.

Letting WPRE(i) denote the fitness of the above-mentioned rule #i (i=1 to 9), WWPRE(i) denote the height of the bar-shaped function on the consequent, and WPPRE (i) denote the position of the bar-shaped function on the consequent, the predicted deviation voltage PREVO2F is calculated in the following manner.

Letting WPRE δ (i) denote the fitness of the antecedent corresponding to the switching function value δPRE(i) and WPREV(i) denote the fitness of the antecedent corresponding to the deviation voltage VO2TM in each rule #i, the fitness WPRE(i) of the rule #i is calculated from Eq. (4) shown below.

$$WPRE(i)=\min\ (WPRE\delta((i),\ WPREV(i)) \tag{4}$$

where min (WPRE δ (i), WPREV(i)) means an operation for selecting a smaller one of the fitnesses WPRE δ (i) and WPREV(i) (minimum selecting operation).

Figure 5A:
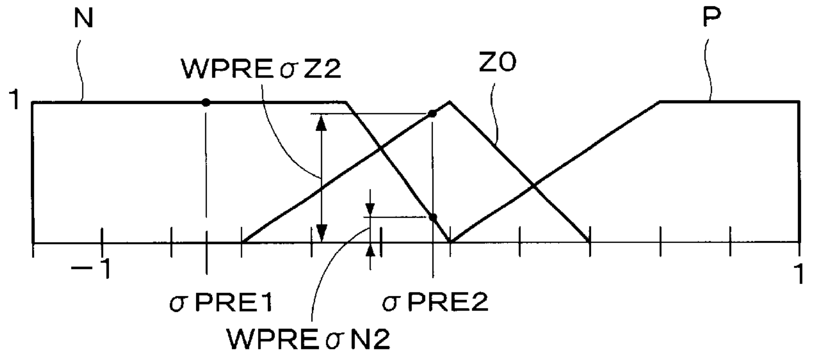
FIGS. 5A to 5C are diagrams for illustrating a calculation method for fitness using the membership functions.
Figure 5B:
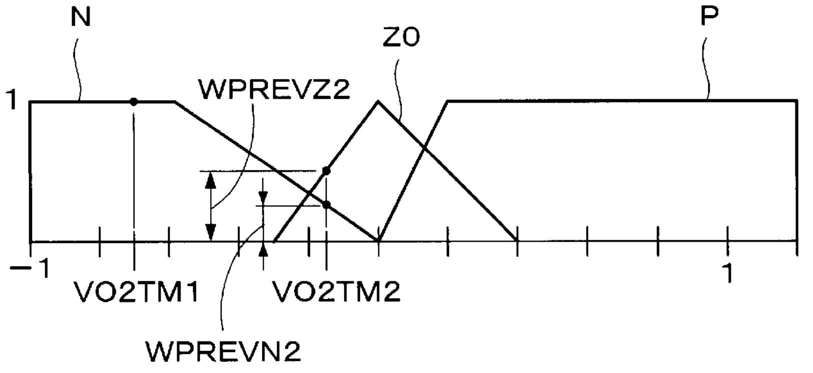

The minimum selecting operation will now be described specifically in the case where δPRE(k)=δPRE1 and VO2TM (k)=VO2TM1 (Case 1) and in the case where δPRE(k)= δPRE2 and VO2TM(k)=VO2TM2 (Case 2) with reference to FIGS. 5A and 5B. As shown in FIGS. 5A and 5B, the relation of WPRE δN2 <WPREVN2 <WPREVZ2 <WPRE δZ2 holds.

Figures 6, 7:
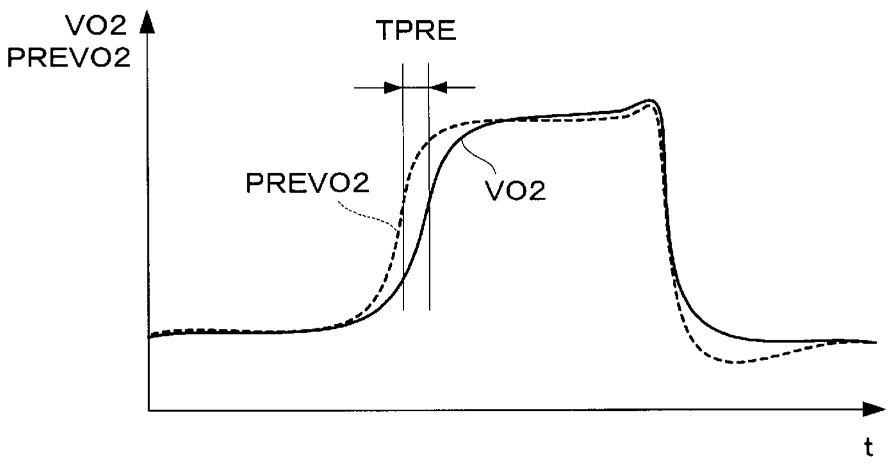
FIG. 6 is a table for illustrating examples of the calculation of the fitness.
FIG. 7 is a time chart showing an actual value and a predicted value of the oxygen concentration sensor output.

In each of the Cases 1 and 2, nine values of the fitness WPRE δ and nine values of the fitness WPREV may be obtained according to the nine rules #1 to #9 as shown in FIG. 6. In each rule #i, a smaller one of the fitnesses WPRE δ and WPREV as hatched is selected. More specifically, in Case 1, WPRE(1)=1, and WPRE(i) for i=2 to 9 is equal to "0". In Case 2, WPRE(1)=WPRE δN2, WPRE(2)= WPREVN2, WPRE(4)=WPRE δN2, WPRE(6)= WPREVZ2, and WPRE(i) for i=3, 6 to 9 is equal to "0".

Figure 5C:
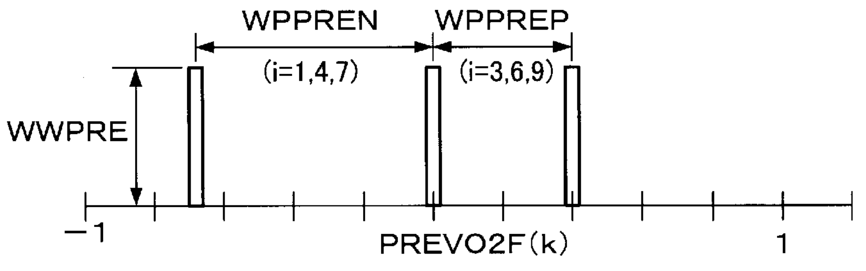

The maximum values of weight on the consequent in all of the rules #i are selected and accumulated. More specifically, the fitness WPRE(i) is multiplied by the height WWPRE(i) and the position WPPRE(i) of the bar-shaped function on the consequent (see FIG. 5C), and the resultant product is accumulated for i=1 to 9 in accordance with Eq. (5) shown below to calculate a weight accumulated value WPRETOTAL. The height WWPRE(i) is set to "1.0" for all of the values of "i" (i=1 to 9). The position WPPRE(i) is set to WPPREN for i=1, 4, 7, WPPREP for i=3, 6, 9, and "0" for i=2, 5, 8 as shown in FIG. 5C.

$$WPRETOTAL=\sum_{i=1}^{9} WPRE(i)\times WWPRE(i)\times WPPRE(i) \tag{5}$$

Next, the weight accumulated value WPRETOTAL is applied to Eq. (6) to calculate the position of the center of gravity (a position of the barycenter) to determine the predicted deviation voltage PREVO2F.

$$PREVO2F=\frac{WPRETOTAL}{\sum_{i=1}^{9} WPRE(i)\times WWPRE(i)} = \frac{\sum_{i=1}^{9} WPRE(i)\times WWPRE(i)\times WPPRE(i)}{\sum_{i=1}^{9} WPRE(i)\times WWPRE(i)} \tag{6}$$

Thus, the predicted deviation voltage PREVO2F as a predicted value of the deviation voltage VO2TM after several sampling periods may be obtained by the predictor based on the fuzzy logic reasoning.

FIG. 7 is a time chart showing the comparison between an O2 sensor output VO2 and a predicted sensor output PREVO2 obtained by adding the predetermined voltage VCNT to the predicted deviation voltage PREVO2F. As shown in FIG. 7, the predicted sensor output PREVO2, which rises earlier by the time TPRE than the O2 sensor output VO2, can be obtained by the predictor based on the fuzzy logic reasoning according to this preferred embodiment. Accordingly, by deciding the termination timing of the reduction enrichment according to the predicted sensor output PREVO2 or the predicted deviation voltage PREVO2F, this embodiment of the invention may prevent a situation from occurring where the termination timing of the reduction enrichment process is delayed which may cause an increase in the emission quantity of HC and CO. As a result, this embodiment provides an exhaust emission control system which is capable of maintaining good exhaust emission characteristics.

A description of the specific control processes by the ECU 5 will now be described with reference to FIGS. 8 to 11.

Figure 8:
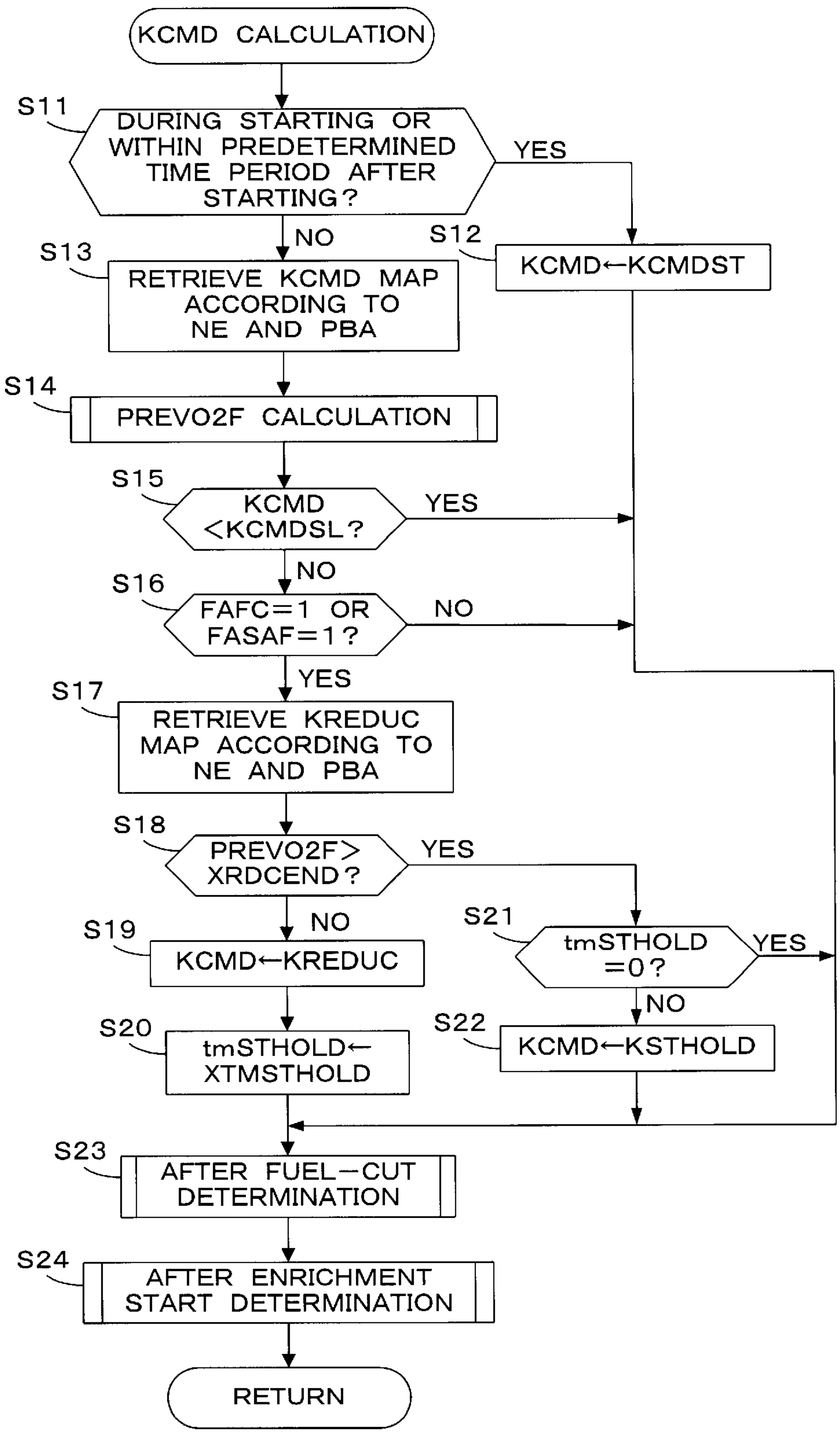
FIG. 8 is a flowchart showing a process for calculating a target air-fuel ratio coefficient (KCMD)

FIG. 8 is a flowchart showing an example of a process for calculating the target air-fuel ratio coefficient KCMD as applied to Eq. (1) mentioned above. This process may be executed by the CPU of the ECU 5 at predetermined time periods (e.g., 30 to 120 msec).

In step S11, the process may determine whether or not the engine 1 is starting or the elapsed time after starting of the engine 1 is within a predetermined time TAST. If the answer to step S11 is affirmative (YES), the target air-fuel ratio coefficient KCMD is set to a predetermined value KCMDST (e.g., 1.0) for the engine starting (step S12), and the process proceeds to step S23.

If the elapsed time after starting of the engine 1 is longer than the predetermined time period TAST, a KCMD map (not shown) is retrieved according to the engine rotational speed NE and the absolute intake pressure PBA to calculate a target air-fuel ratio coefficient KCMD according to an engine operating condition (step S13). In the engine operating condition where the lean operation is performed, the target air-fuel ratio coefficient KCMD is set to a value, for example, which is less than "1.0".

Figure 9:
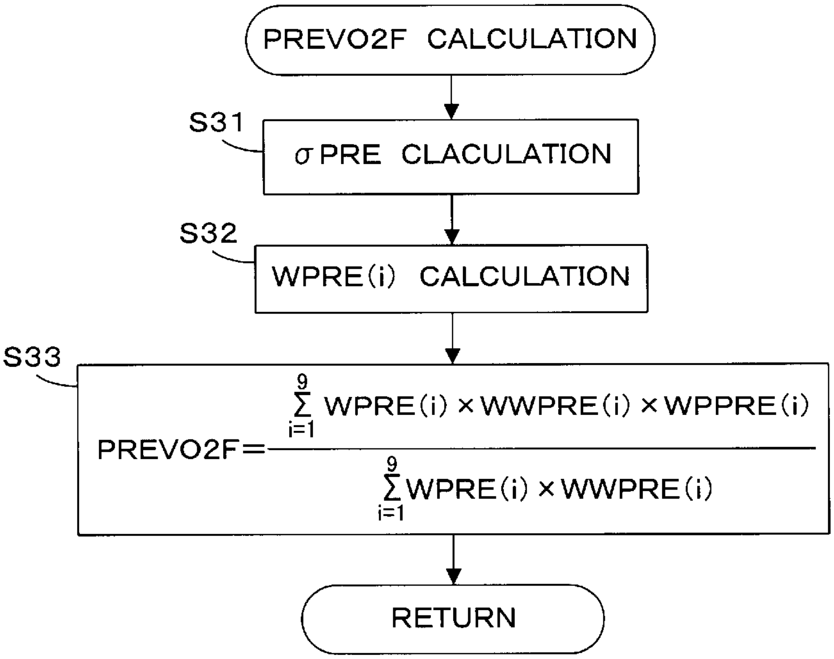
FIG. 9 is a flowchart showing a process for calculating a predicted deviation voltage (PREVO2F)

In step S14, the PREVO2F calculation process which is shown in FIG. 9 is executed to calculate the predicted deviation voltage PREVO2F by the predictor based on the fuzzy logic reasoning as mentioned above. The process next determines whether or not the target air-fuel ratio coefficient KCMD is less than a predetermined value KCMDSL which may be almost approximately equal to "1.0" (step S15). If KCMD is less than KCMDSL, this indicates that the engine 1 is in the lean operation, and the process proceeds to step S23. If KCMD is greater than or equal to KCMDSL, the process proceeds to step S16. During the fuel-cut operation, the target air-fuel ratio coefficient KCMD is set to, for example, "1.0". Accordingly, during the fuel-cut operation or immediately after the termination of the fuel-cut operation, the process proceeds from step S15 to step S16.

In step S16, the process determines whether or not an after fuel-cut flag FAFC or an after enrichment start flag FASAF is, for example, "1". The after fuel-cut flag FAFC may be set to "1" when the elapsed time after the termination of the fuel-cut operation is within a predetermined time period XTMAFC (e.g., 15 sec) or when the fuel-cut operation is in execution. The after enrichment start flag FASAF may be set to, for example, "1" when the elapsed time after changing the target air-fuel ratio coefficient KCMD from a value less than 1.0 to a value greater than or equal to 1.0, (i.e., after shifting from the lean operation to the stoichiometric or rich operation), occurs within a predetermined time period XTMASAF (e.g., 10 sec) or when the lean operation is in execution.

If the answer to step S16 is negative (NO), i.e., if both the FAFC and FASAF are equal to "0", the process proceeds to step S23. If either the FAFC or the FASAF is equal to, for example, "1", the process proceeds to step S17. During the lean operation, the process proceeds from step S15 to step S23. Accordingly, when the elapsed time after termination of the fuel-cut operation is within the predetermined time period XTMAFC or the elapsed time after shifting from the lean operation to the stoichiometric or rich operation is within the predetermined time period XTMASAF, the process proceeds from step S16 to step S17.

In step S17, a KREDUC map (not shown) may be retrieved according to the engine rotational speed NE and the absolute intake pressure PBA to calculate an enrichment coefficient value KREDUC which is greater than or equal to 1.0. The KREDUC map may be set so that the enrichment coefficient value KREDUC increases as the engine rotational speed NE and/or the absolute intake pressure PBA decreases.

In step S18, the process may determine whether or not the predicted deviation voltage PREVO2F calculated in step S14 has exceeded a predetermined threshold XRDCEND (e.g., 0 V). Initially after the start of the enrichment process, PREVO2F is less than XRDCEND. Accordingly, the process proceeds to step S19, in which the target air-fuel ratio coefficient KCMD calculated in step S13 is changed to the enrichment coefficient value KREDUC calculated in step S17. Then, a downcount timer tmSTHOLD in step S21 is set to a predetermined hold time period XTMSTHOLD and started (step S20). Thereafter, the process proceeds to step S23.

By setting the target air-fuel ratio coefficient KCMD to the enrichment coefficient value KREDUC, the oxygen stored in the three-way catalyst 14 is removed immediately after the termination of the fuel-cut operation, and the NOx stored in the NOx removing device 15 is removed immediately after shifting from the lean operation to the stoichiometric or rich operation. When the removal of the oxygen or NOx is completed, the output from the O2 sensor 18 changes from a value indicative of a lean air-fuel ratio to a value indicative of a rich air-fuel ratio. As mentioned above, the predicted deviation voltage PREVO2F rises slightly earlier than the sensor output VO2. When the predicted deviation voltage PREVO2F exceeds the predetermined threshold XRDCEND, the process proceeds from step S18 to step S21. In step S21, it is determined whether or not the value of the timer tmSTHOLD started in step S20 becomes "0". Since tmSTHOLD is greater than "0" initially, the target air-fuel ratio coefficient KCMD is set to a predetermined value KSTHOLD (e.g., 1.0) corresponding to the stoichiometric air-fuel ratio (step S22). Thereafter, the process proceeds to step S23. When the predetermined hold time period XTMSTHOLD has elapsed, the process jumps from step S21 to step S23.

By executing the steps S20, S21, and S22, the target air-fuel ratio coefficient KCMD is held at a value corresponding to the stoichiometric air-fuel ratio during the predetermined hold time period XTMSTHOLD after the termination of the reduction enrichment. After the elapse of the predetermined hold time period XTMSTHOLD, the normal control is restarted to use the target air-fuel ratio coefficient KCMD calculated in step S13 without modification.

Figure 10:
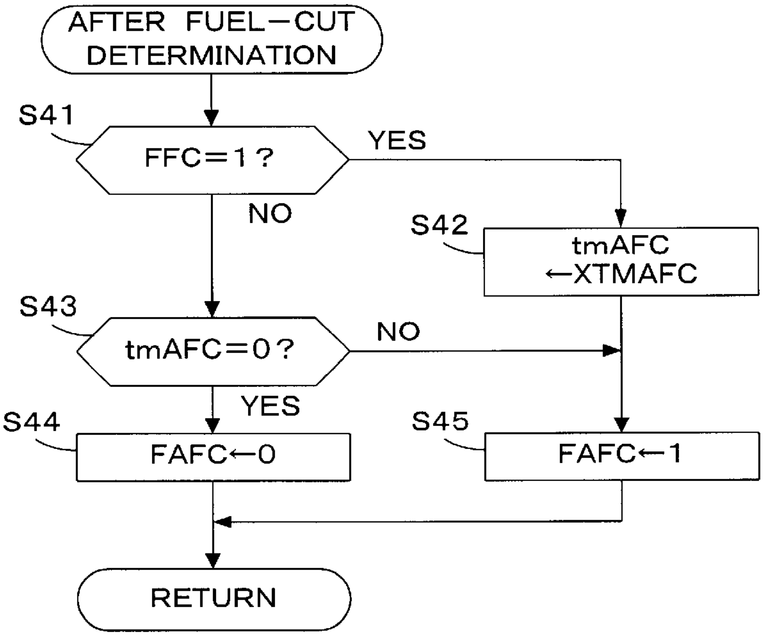
FIG. 10 is a flowchart showing a process for setting an after fuel-cut flag (FAFC)
Figure 11:
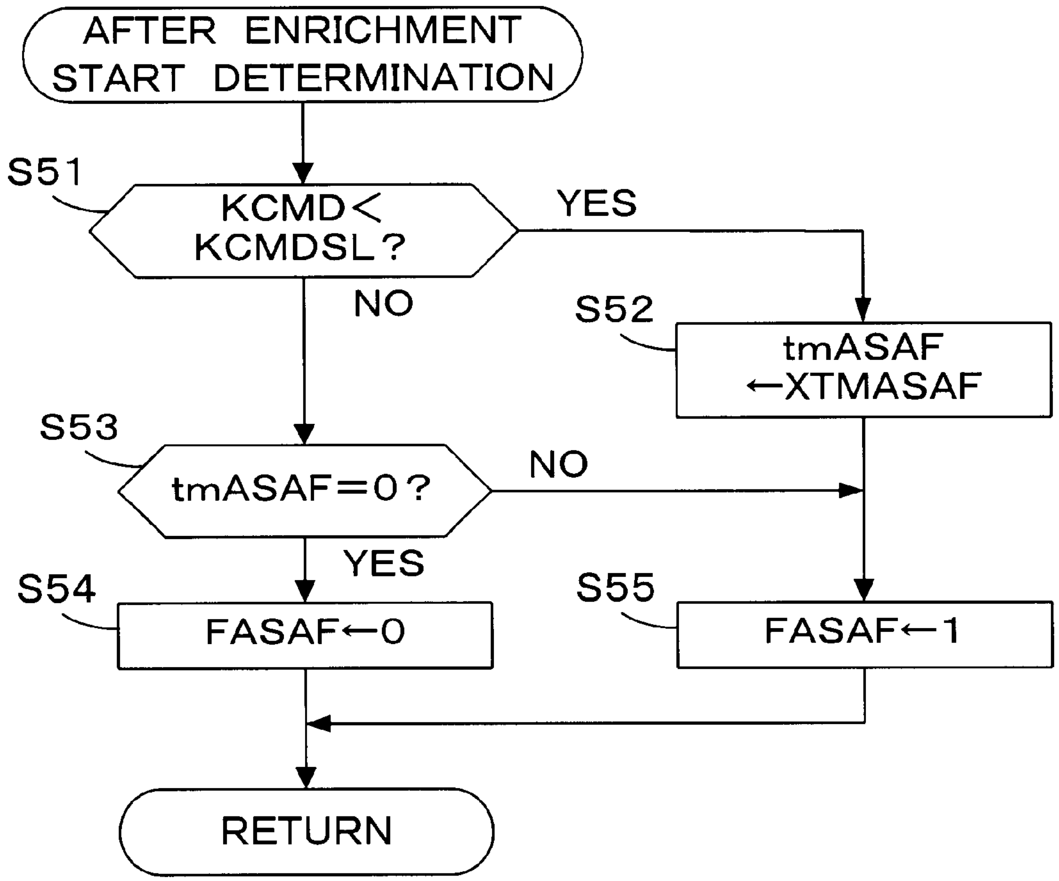
FIG. 11 is a flowchart showing a process for setting an after enrichment start flag (FASAF).

In step S23, an after fuel-cut determination process shown in FIG. 10 is executed to set the after fuel-cut flag FAFC. In step S24, an after enrichment start determination process shown in FIG. 11 is executed to set the after enrichment start flag FASAF. Thereafter, this process ends.

According to the process of FIG. 8, the completion of the removal of the oxygen stored in the three-way catalyst 14 or the completion of the removal of the NOx stored in the NOx removing device 15 may be determined according to the predicted deviation voltage PREVO2F calculated on the basis of the fuzzy logic reasoning. Accordingly, the completion timing of removal of the oxygen or NOx can be detected earlier than conventional device where the determination is performed according to the O2 sensor output VO2 itself. As a result, it is possible to prevent the time period of execution of the reduction enrichment from being too long, which can cause an increase in the emission quantity of HC and CO. Therefore, this embodiment of the invention renders an exhaust emission control system that is capable of maintaining good exhaust emission characteristics.

Further, the target air-fuel ratio coefficient KCMD may be held at the value KSTHOLD corresponding to the stoichiometric air-fuel ratio during the predetermined hold time period XTMSTHOLD after the termination of the reduction enrichment process. Accordingly, it is possible to sufficiently remove a small amount of oxygen or NOx remaining in the three-way catalyst 14 or in the NOx removing device 15 at the termination timing of the reduction enrichment process.

That is, there may be a situation where the oxygen or NOx stored in the three-way catalyst 14 or in the NOx removing device 15 cannot be completely removed, but may partially remain even after the termination of the reduction enrichment process, depending on the structure of the three-way catalyst 14 or the NOx removing device 15. According to this preferred embodiment, however, the exhaust emission characteristics can be maintained at a good condition by the operation of the three-way catalyst 14, and the removal of the oxygen or NOx can be completely attained by maintaining the air-fuel ratio at a value near the stoichiometric air-fuel ratio during the predetermined hold time period XTMSTHOLD after the termination of the reduction enrichment process.

FIG. 9 is a flowchart showing the PREVO2F calculation process executed in step S14 shown in FIG. 8.

In step S31, the switching function value a PRE(k) is calculated from Eq. (3) mentioned above. Next, the fitness WPRE(i) of the antecedent for each rule #i (i=1 to 9) is calculated from Eq. (4) mentioned above (step S32).

In step S33, the barycenter calculation is performed from Eq. (6) mentioned above to calculate the predicted deviation voltage PREVO2F.

FIG. 10 is a flowchart showing the after fuel-cut determination process executed in step S23 shown in FIG. 8.

In step S41, the process determines whether or not a fuel-cut flag FFC is, for example, “1”, indicating that the fuel-cut operation is executed. If the FFC is, for example, “1”, a downcount timer tmAFC is set to a predetermined time period XTMAFC and started (step S42). Then, after fuel-cut flag FAFC is set to, for example, “1” (step S45).

When the fuel-cut operation is terminated and the fuel-cut flag FFC accordingly changes from “1” to “0”, the process proceeds from step S41 to step S43. In step S43, the process may determine whether or not the value of the timer tmAFC is “0”. If tmAFC is greater than “0”, the process proceeds to step S45. If tmAFC is equal to “0”, the after fuel-cut flag FAFC is reset to “0” (step S44).

FIG. 11 is a flowchart showing the after enrichment start determination process executed in step S24 shown in FIG. 8.

In step S51, the process may determine whether or not the target air-fuel ratio coefficient KCMD is less than the predetermined value KCMDSL. If KCMD is less than KCMDSL (the lean operation is in execution), a downcount timer tmASAF is set to a predetermined time period XTMASAF and started (step S52). Next, the after enrichment start flag FASAF is set to, for example, “1” (step S55).

When the reduction enrichment is started and the target air-fuel ratio coefficient KCMD is set to a value greater than or equal to the predetermined value KCMDSL, the process proceeds from step S51 to step S53. In step S53, the process determines whether or not the value of the timer tmASAF is “0”. If tmASAF is greater than “0”, the process proceeds to step S55. When the value of the timer tmASAF becomes “0”, the after enrichment start flag FASAF is reset to “0” (step S54).

In this preferred embodiment, the three-way catalyst 14 and the NOx removing device 15 may constitute the exhaust gas purifying means. The ECU 5 may constitute the air-fuel ratio control means, the predicting means, and the determining means. More specifically, steps S15 to S24 shown in FIG. 8 correspond to the air-fuel ratio control means. Step S14 shown in FIG. 8, i.e., the process of FIG. 9, corresponds to the predicting means. Step S18 shown in FIG. 8 corresponds to the determining means.

The present invention is not limited to the above preferred embodiment, but various modifications may be made. For example, the target air-fuel ratio coefficient KCMD or the enrichment coefficient value KREDUC may be calculated according to the engine rotational speed NE and the absolute intake pressure PBA in step S13 or S17 shown in FIG. 8. The target air-fuel ratio coefficient KCMD or the enrichment coefficient value KREDUC may be calculated according to the engine rotational speed NE and a demanded engine output corresponding to a depression amount of an accelerator pedal in the vehicle driven by the engine, instead of using the absolute intake pressure PBA.

Further, the predicted deviation voltage PREVO2F may be calculated by using the deviation voltage VO2TM and the switching function value δPRE calculated by using the deviation voltage VO2TM, as the input parameters of the predictor in the above preferred embodiment. The predicted O2 sensor output PREVO2 may be calculated using the O2 sensor output VO2 and a switching function value δPREa calculated using the O2 sensor output VO2, as the input parameters of the predictor. The switching function value a PREa may be defined by the following equation.

$$\delta PREa = VO2(k) + PRES \times VO2(k-1)$$

The predetermined value KSTHOLD in step S22 shown in FIG. 8 is preferably set to “1.0” corresponding to the stoichiometric air-fuel ratio. The predetermined value KSTHOLD may be set to a value which is slightly less than “1.0” or a value which is slightly greater than “1.0”, that is, a value corresponding to an air-fuel ratio in the vicinity of the stoichiometric air-fuel ratio.

The present invention may be applied to the engine 1 having the exhaust pipe 13 provided with the three-way catalyst 14 having an oxygen storing ability and with the NOx removing device 15 having a NOx storing ability in the above preferred embodiment. The present invention may be applied to an engine having an exhaust pipe provided with any one of such a three-way catalyst and a NOx removing device.

A binary type oxygen concentration sensor may be used as the O2 sensor 18 in the above preferred embodiment. A linear type oxygen concentration sensor similar to the LAF sensor 17 may be used as the O2 sensor or 18.

What is claimed is:

1. An exhaust emission control system for an internal combustion engine having an exhaust system, comprising:

an exhaust gas purifying means provided in said exhaust system and for storing at least one of oxygen and nitrogen oxides;

an oxygen concentration sensor provided downstream of said exhaust gas purifying means;

an air-fuel ratio control means for enriching an air-fuel ratio of an air-fuel mixture supplied to said engine with respect to the stoichiometric air-fuel ratio, to thereby reduce oxygen or nitrogen oxides stored in said exhaust gas purifying means;

predicting means for calculating a predicted value of an output from said oxygen concentration sensor by using a predictor subroutine based on a fuzzy logic process; and determining means for determining the completion of reduction of the oxygen or nitrogen oxides stored in said exhaust gas purifying means, according to the predicted value calculated by said predicting means.

2. An exhaust emission control system according to claim 1, wherein said air-fuel ratio control means terminates the enrichment of the air-fuel ratio when the predicted value has changed from a value indicative of a lean air-fuel ratio with respect to the stoichiometric air-fuel ratio to a value indicative of a rich air-fuel ratio with respect to the stoichiometric air-fuel ratio.

3. An exhaust emission control system according to claim 2, wherein said air-fuel ratio control means controls the air-fuel ratio to a value substantially at the stoichiometric air-fuel ratio during a predetermined time period after termination of the enrichment.

4. An exhaust emission control system according to claim 1, wherein said predicting means uses the output from said oxygen concentration sensor as an input of said predictor in calculating the predicted value.

5. An exhaust emission control system according to claim 1, wherein said predicting means uses the output from said oxygen concentration sensor and a parameter including a steady-state component and a component indicative of an amount of change in the output from said oxygen concentration sensor as inputs of the predictor in calculating the predicted value.

6. An exhaust emission control system according to claim 1, wherein said predicting means calculates the predicted value using a min-max-barycenter method and a bar-shaped function on a consequent of the fuzzy logic process.

7. An exhaust emission control system according to claim 1, wherein said air-fuel ratio control means executes the enrichment of the air-fuel ratio when a fuel-cut operation for cutting off the supply of fuel to said engine is terminated or when a target air-fuel ratio of the air-fuel mixture supplied to said engine is changed from a lean value with respect to the stoichiometric air-fuel ratio to the stoichiometric air-fuel ratio or to a rich value with respect to the stoichiometric air-fuel ratio.

8. An exhaust emission control method for an internal combustion engine having an exhaust system, an exhaust gas purifying device provided in said exhaust system and for storing at least one of oxygen and nitrogen oxides, and an oxygen concentration sensor provided downstream of said exhaust gas purifying device, said method comprising the steps of;

a) enriching an air-fuel ratio of an air-fuel mixture supplied to said engine with respect to the stoichiometric air-fuel ratio, to thereby reduce oxygen or nitrogen oxides stored in said exhaust gas purifying device;

b) calculating a predicted value of an output from said oxygen concentration sensor using a predictor subroutine based on a fuzzy logic process; and c) determining the completion of reduction of the oxygen or nitrogen oxides stored in said exhaust gas purifying device, according to the predicted value calculated at step b).

9. An exhaust emission control method according to claim 8, wherein the enrichment of the air-fuel ratio is terminated when the predicted value has changed from a value indicative of a lean air-fuel ratio with respect to the stoichiometric air-fuel ratio to a value indicative of a rich air-fuel ratio with respect to the stoichiometric air-fuel ratio.

10. An exhaust emission control method according to claim 9, wherein the air-fuel ratio is controlled to a value substantially at the stoichiometric air-fuel ratio during a predetermined time period after termination of the enrichment.

11. An exhaust emission control method according to claim 8, wherein the output from said oxygen concentration sensor is used as an input of said predictor in calculating the predicted value.

12. An exhaust emission control method according to claim 8, wherein the output from said oxygen concentration sensor and a parameter including a steady-state component and a component indicative of an amount of change in the output from said oxygen concentration sensor are used as inputs of the predictor in calculating the predicted value.

13. An exhaust emission control method according to claim 8, wherein the predicted value is calculated using a min-max-barycenter method and a bar-shaped function on a consequent of the fuzzy logic process.

14. An exhaust emission control method according to claim 8, wherein the enrichment of the air-fuel ratio is executed when a fuel-cut operation for cutting off the supply of fuel to said engine is terminated or when a target air-fuel ratio of the air-fuel mixture supplied to said engine is changed from a lean value with respect to the stoichiometric air-fuel ratio to the stoichiometric air-fuel ratio or to a rich value with respect to the stoichiometric air-fuel ratio.

15. An exhaust emission control system for an internal combustion engine having an exhaust system, comprising:

an exhaust gas purifying device provided in said exhaust system and for storing at least one of oxygen and nitrogen oxides;

an oxygen concentration sensor provided downstream of said exhaust gas purifying device;

an air-fuel ratio control module for enriching an air-fuel ratio of an air-fuel mixture supplied to said engine with respect to the stoichiometric air-fuel ratio, to thereby reduce oxygen or nitrogen oxides stored in said exhaust gas purifying device;

a predicting module for calculating a predicted value of an output from said oxygen concentration sensor using a predictor subroutine based on a fuzzy logic process; and a determining module for determining the completion of reduction of the oxygen or nitrogen oxides stored in said exhaust gas purifying device, according to the predicted value calculated by said predicting module.

16. An exhaust emission control system according to claim 15, wherein said air-fuel ratio control module terminates the enrichment of the air-fuel ratio when the predicted value has changed from a value indicative of a lean air-fuel ratio with respect to the stoichiometric air-fuel ratio to a value indicative of a rich air-fuel ratio with respect to the stoichiometric air-fuel ratio.

17. An exhaust emission control system according to claim 16, wherein said air-fuel ratio control module controls the air-fuel ratio to a value substantially at the stoichiometric air-fuel ratio during a predetermined time period after termination of the enrichment.

18. An exhaust emission control system according to claim 15, wherein said predicting module uses the output from said oxygen concentration sensor as an input of said predictor in calculating the predicted value.

19. An exhaust emission control system according to claim 15, wherein said predicting module uses the output from said oxygen concentration sensor and a parameter including a steady-state component and a component indicative of an amount of change in the output from said oxygen concentration sensor as inputs of the predictor in calculating the predicted value.

20. An exhaust emission control system according to claim 15, wherein said predicting module calculates the predicted value using a min-max-barycenter method and a bar-shaped function on a consequent of the fuzzy logic process.

21. An exhaust emission control system according to claim 15, wherein said air-fuel ratio control module executes the enrichment of the air-fuel ratio when a fuel-cut operation for cutting off the supply of fuel to said engine is terminated or when a target air-fuel ratio of the air-fuel mixture supplied to said engine is changed from a lean value with respect to the stoichiometric air-fuel ratio to the stoichiometric air-fuel ratio or to a rich value with respect to the stoichiometric air-fuel ratio.

* * * * *